United States Patent

Ho et al.

[15] 3,665,210

[45] May 23, 1972

[54] MONOLITHIC BIPOLAR CONVERTIBLE STATIC SHIFT REGISTER

[72] Inventors: Irving T. Ho, Poughkeepsie; Peter E. Howell, Wappingers Falls; Teh-Sen Jen, Fishkill, all of N.Y.

[73] Assignee: International Business Machines Corporation, Armonk, N.Y.

[22] Filed: June 30, 1970

[21] Appl. No.: 51,188

[52] U.S. Cl. ............................................307/238, 307/221

[51] Int. Cl. ................G11c 11/24, G11c 11/34, G11c 19/00

[58] Field of Search ..........................307/221, 223, 224, 238

[56] References Cited

UNITED STATES PATENTS 3,406,346 10/1968 Wanlass ............................307/221 C 3,252,009 5/1966 Weimer ............................307/223 X 3,289,010 11/1966 Bacon et al. ............................307/221

3,082,332 3/1963 Smeltzer et al. ..................307/221 X

*Primary Examiner*—John Zazworsky

*Attorney*—Hanifin and Jancin and Kenneth R. Stevens

[57] ABSTRACT

A storage cell suitable for implementation as a monolithic shift register in which a pair of monolithic parasitic capacitors are selectively charged solely in response to periodic non-dc signals to set the digital state of the storage cell. Semiconductor switching means connected between the first and second capacitors is responsive to periodic signals to regenerate the cell for operation in a static mode. Alternatively, a dc circuit prevents loss of cell information during a static mode. The semiconductor switching means is virtually eliminated from the circuit by proper biasing so as to also render the cell operable for use in a dynamic shift register mode.

13 Claims, 5 Drawing Figures

INVENTORS
IRVING T. HO
PETER E. HOWELL
TEH-SEN JEN

BY Kenneth R. Stevens
ATTORNEY

MONOLITHIC BIPOLAR CONVERTIBLE STATIC SHIFT REGISTER

BACKGROUND OF THE INVENTION

1. Field of the Invention

The invention relates to memories and more particularly to monolithic memories using semiconductor devices.

2. Brief description of the Prior Art

In the past, memories constructed of field effect transistors (FET) have proven to be extremely suitable for implementation in monolithic form. However, for some system functions, it has been found that improved figures of merits are obtainable over FET type memories by employing instead bipolar transistors. In bipolar monolithic memories, lower voltages are required and thus reduced power dissipation is achieved. Also, accessing times are decreased because the parasitic storage elements or capacitors used in connection with bipolar devices are of smaller value than with FET devices. Another advantage is the fact that semiconductor processing technology is further advanced in the bipolar transistor area as contrasted with the FET device area.

SUMMARY OF THE INVENTION

It is an object of the present invention to provide a monolithic memory which can be fabricated in high device densities with attendant reduced power requirements than known prior art monolithic memories.

It is another object of the present invention to provide a memory which is extremely adaptable to monolithic technology and which can be readily incorporated with simplified logic and decoding circuitry.

Another object of the present invention is to provide a monolithic memory which requires substantially reduced power requirements over known bipolar dc storage type cells.

Another object of the present invention is to provide a shift register which operates on reduced power requirements in either a static or a dynamic circulating mode, and which embodies a minimum number of elements.

A further object of the present invention is to provide a memory which is suitable for implementation as a shift register and which is highly adaptable to fabrication in monolithic form by virtue of a configuration which reduces the complexity of the metallurgical interconnections required.

In accordance with the above mentioned objects, the present invention provides a monolithic shift register for storing digital information including a plurality of interconnected cells. Each cell comprise a first and a second parasitic capacitor which are selectively charged solely in response to a periodic non-dc regeneration source in order to store digital information. A semiconductor switching means is connected between the first and second capacitors and is selectively operable in order to maintain the cell at the desired digital level during standby.

The foregoing and other objects, features and advantages of the invention will be apparent from the following, more particular description of the embodiment mentioned, as illustrated in the accompanying drawing:

BRIEF DESCRIPTION OF THE PREFERRED EMBODIMENTS

Figure 1:
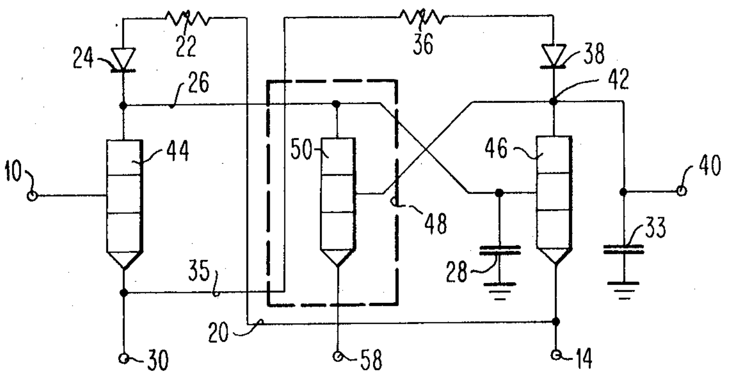
FIG. 1 is a schematic diagram illustrating a preferred embodiment storage cell which operates solely on periodic non-dc signals.

FIG. 1 illustrates a storage cell which is advantageously implemented as a shift register in monolithic form. The bipolar storage cell does not require any dc signals when used in a static mode of operation and thus the power requirements are extremely small. As a result, high density levels of integration are possible.

Figure 1A:
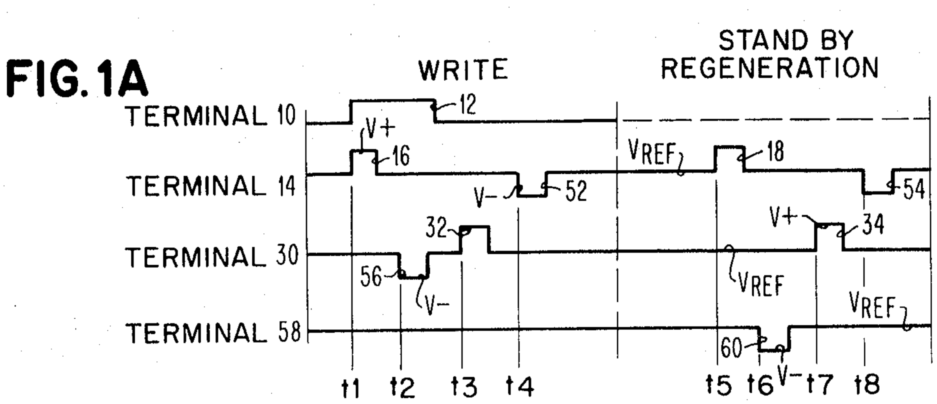
FIG. 1A illustrates a timing diagram used to explain the operation of the cell in FIG. 1.

A data input terminal 10 is adapted to receive a digital input signal, one of which is illustrated as a binary 1 at 12 in FIG. 1A. A first regeneration signal is applied to terminal 14 and is depicted by regeneration signal pulses 16 and 18. A first charging line or path comprising line 20, resistor 22, diode 24, and line 26 is connected to a first storage capacitor 28. A second regeneration source is connected to a terminal 30. The second regeneration source, depicted by pulses 32 and 34, FIG. 1A, functions to selectively charge a second storage capacitor 33 connected to a second charging line constituting line 35, resistor 36, and diode 38. The second capacitor 33 is connected between an output terminal 40 and a node 42.

In order to selectively charge capacitor 28 the input signals are applied to the base of an input switching transistor 44. So as to selectively charge the second capacitor 33, a switching transistor 46 is connected via its base terminal to capacitor 28, to the output terminal 40, and to the capacitor 33 at node 42, which is its collector terminal.

In order to regenerate or maintain the digital information which is stored in the cell, a semiconductor switching means 48 comprising a transistor 50 is connected at its collector terminal to line 26, and at its base terminal to node 42.

In order to selectively switch the transistors, terminal 14 is adapted to receive control pulse signals 52 and 54 which are applied to the emitter of transistor 46. The control signals 52 and 54 do not affect the rest of the circuit via line 20 since diode 24 is backbiased in response to their relatively negative polarities. Likewise, terminal 30 is adapted to receive a control pulse signal 56 for conditioning the emitter terminal of transistor 44 to a relatively negative voltage value such that it will conduct if the input signal applied at terminal 10 is sufficiently positive with respect to its emitter voltage. Finally, a terminal 58 connected to the emitter of transistor 50 is adapted to receive a control pulse signal 60 so as to allow transistor 50 to conduct if the signal applied at its base connection is sufficiently positive with respect to its emitter.

When implementing the cell of FIG. 1 in monolithic form, a plurality of cells are interconnected on a single substrate to form a shift register. In such an implementation, the capacitors 28 and 33 are not discrete elements, but are actually parasitic capacitances of the monolithic circuit. Since these values are extremely small increased speed of operation is realized. According to well known principles of monolithic circuit technology, capacitor 28 represents the collector to substrate capacitance of transistor 44, and capacitor 33 represents the parasitic collector to substrate capacitance of transistor 46.

The circuit configuration of FIG. 1 is particularly advantageous when implemented in monolithic form because the number of interconnection lines are reduced in that common points and lines are shared by a single input terminal. For example, in integrated circuit monolithic form terminal or pad 30 provides access to line 35 in a charging mode of operation and also functions to provide access for a control voltage to the emitter of switching transistor 44. This is also true with respect to terminal 14 and its access to the emitter of transistor 46 and to line 20. Reducing the number of input terminals or pads and the complexity of metallization patterns in integrated circuits is extremely important in the light of the extremely small dimensions which are being used in present day technologies.

In its preferred embodiment, the circuit of FIG. 1 is intended to be implemented as a static shift register. However, as will be more fully explained in the operation of the circuit of FIG. 1, it may be modified such that it can be operated in a dynamic or recirculating shift register mode.

Operation of the Circuit of FIG. 1

The operation of the storage cell in FIG. 1 is described by first explaining how information is written into the cell and then describing how the information is regenerated or maintained during a static mode.

At time *t*1, a binary one is applied to input terminal 10. Simultaneously, a regeneration pulse is applied at terminal 14 which charges capacitor 28 to a positive value V+ as determined by the amplitude of pulse 16. At this time, the emitter terminal of transistor 44 is at some value which is designated as $V_{REF}$. The value of $V_{REF}$ is selected such that the base is not sufficiently positive with respect to the emitter so that transistor 44 is in a non-conductive state. At time *t*2, the emitter of transistor 44 receives control pulse 56 of a value v— which further lowers the emitter voltage such that the base to emitter junction is sufficiently positively biased and transistor 44 conducts. Capacitor 28 is therefore discharged through line 26 and transistor 44. At this time capacitor 28 is deemed to possess a charge which is representative of a binary zero. In other words, a binary one applied to terminal 10 is effective to result in a binary zero to be stored in capacitor 28. If a binary zero had been applied to the input terminal 10 during this period of operation, the base to emitter voltage of transistor 44 would not have been sufficiently forwardly biased so as to render it conductive, and thus capacitor 28 would not discharge. Thus, capacitor 28 would contain a charge which is representative of a binary one and represents the inverse of the signal which was initially applied to the input terminal 10. Accordingly, transistor 44 functions to selectively charge capacitor 28 by either discharging the charge which is initially received from the regeneration source at terminal 14, or discharging it when it is placed in a conductive state.

At time *t*3, terminal 30 receives a regeneration signal pulse 32 which is effective to charge capacitor 33 to a voltage of V+ via line 35, resistor 36, and diode 38. At time *t*4, the emitter terminal of transistor 46 is lowered to a relatively negative value of V— upon receipt of control pulse 52 at terminal 14. However, capacitor 28 is discharged or in a low state and thus the base to emitter voltage of transistor 46 is not sufficient to forwardly bias the transistor 46 into conduction. Therefore, capacitor 33 remains positively charged and the output terminal 40 is at a relatively high value which is representative of a binary one. Accordingly, during a write cycle a binary one has been stored in the cell. Likewise, if a binary zero had originally been applied to the input terminal 10, then, the capacitor 28 would at this time be charged so as to place the base of transistor 46 at a sufficiently positive value with respect to its emitter such that transistor 46 would conduct and thus the charge on capacitor 33 would be discharged and a binary zero would be written into the storage cell.

In a static mode of operation it is necessary to regenerate the charge on the capacitor 33 since the stored information would be lost through leakage. In order to regenerate the information the semiconductor switching means 48 is used. At time t5, the capacitor 28 is charged by regeneration pulse 18 via input terminal 14. In the example of a binary one being written into the cell, capacitor 28 is in a discharged state, and thus capacitor 28 is charged to a value of V+. Next at time t6, the emitter terminal of transistor 50 is lowered to a relatively negative value by the application of control signal 60 applied to terminal 58. At this time, node 42 is at a relatively positive value by virtue of the charge stored on the capacitor 33 and the base terminal of transistor 50 is relatively positive. Upon the application of control signal 60, the base to emitter voltage of transistor 50 is sufficiently forwardly biased so as to render it conductive and thus discharge the stored charge on capacitor 28 therethrough. At time *t*7, a regeneration pulse 34 is applied via terminal 30 so as to charge capacitor 33 to a relatively positive value. In the illustrative example of regenerating a binary one, any charge which has leaked off of capacitor 33 is replenished by regeneration pulse 34. In a similar manner to the write operation, the base terminal of transistor 46 is at a relatively negative value because capacitor 28 is in a discharged state and therefore transistor 46 will not conduct at time *t*8 when a negative control pulse 54 is applied to the terminal 14.

If on the other hand, a binary zero is being regenerated in the cell, the capacitor 28 would be at a relatively positive value and thus upon the application of control signal 54 the transistor 46 would be sufficiently forwardly biased such that the charge stored on capacitor 33 would discharge therethrough, and again output terminal 40 would be at a representative binary zero level.

In a static mode of operation the circuit in FIG. 1 has particular advantages when power requirements are of critical consideration since the cell operates in a static mode of storage without requiring any dc signals. However, this cell is convertible in that the emitter of transistor 50 can be biased at terminal 58 such that it remains in a non-conductive state. Thus, in effect, transistor 50 would be virtually eliminated from the circuit as a functional element. With transistor 50 eliminated from the circuit the cell is adaptable for implementation in a dynamic or circulating shift register mode of operation. The same mode of operation is described in U. S. Pat. application Ser. No. 18,583, filed Mar. 11, 1970, in the name of Irving T. Ho, and assigned to the assignee of the present application.

Figure 2:
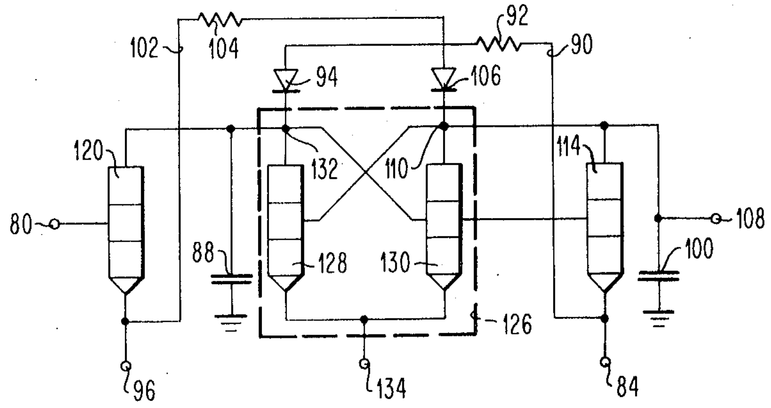
FIG. 2 illustrates an alternative storage cell which maintains the stored information by employing a dc circuit.
Figure 2A:
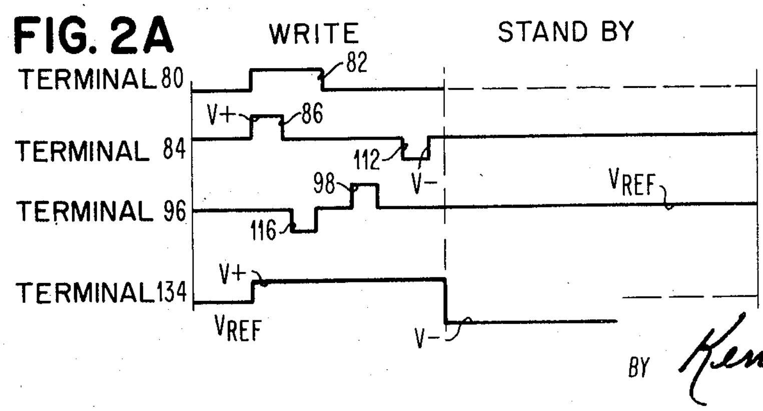
FIG. 2A is the accompanying timing diagram used to explain the operation of the cell in FIG. 2.

Brief Description of the Preferred Embodiment of FIG. 2

The storage cell of FIG. 2 is similar in operation and structure to that described in FIG. 1 except that once the information is written into the cell, a dc signal must be continually applied in order to prevent loss of information when the cell is interconnected to form a multistage static shift register. An input terminal 80 is adapted to receive an input binary signal 82 which is designated a binary one for purposes of illustration. Terminal 84 is adapted to receive a regeneration pulse 86 so as to selectively charge capacitor 88 via line 90, resistor 92, and diode 94. Similarly, terminal 96 is adapted to receive a regeneration pulse 98 so as to charge capacitor 100 by way of line 102, resistor 104, and diode 106. An output terminal 108 is connected to the capacitor 100 and to a node 110.

Again and similar to the circuit in FIG. 1 a control pulse 112 is applied to terminal 84 in order to selectively place an output switching transistor 114 in a conductive state. Similarly, a negative control pulse 116 is applied to terminal 96 to switch an input transistor 120 to a conductive state when terminal 80 is sufficiently positive with respect to the voltage at terminal 96. In order to maintain the written information on the storage cell of FIG. 2, a semiconductor switching means 126 comprising a pair of directly cross-coupled transistors 128 and 130 is connected between the node 110, a node 132, and a terminal 134. During a write operation, terminal 134 is adapted to receive a dc signal having a value of V+, and during a standby state a dc signal of V— value is applied to terminal 134.

Assuming it is desired to write into the storage cell of FIG. 2, a binary one signal depicted at 82 is applied to input terminal 80. Simultaneously therewith, capacitor 88 is charged to a value of V+ by the application of regeneration signal 86 to terminal 84. Then, terminal 96 is lowered by control signal 116 to a voltage value of V— such that the base to emitter voltage of transistor 120 is sufficiently forwardly biased to render it conductive and thus capacitor 88 discharges to a value which is indicative of a binary zero. Next, capacitor 100 is charged to a voltage value of V+ by the application of signal 98 to terminal 96. When the emitter of transistor 114 is brought to a relatively negative value of V— by the application of control signal 112 to terminal 84, its base voltage is not sufficiently positive to render it conductive. This occurs because the voltage across capacitor 88 is transmitted from node 132 and is ineffective to sufficiently forwardly bias the base of transistor 114 to a conductive state. The voltage which appears at node 132 appears at the base of transistor 130 and at the base of transistor 114 according to well known integrated circuit fabrication principles. In one example, this would result because the base region of transistors 130 and 114 are constructed as a single bed. Since the voltage at node 132 is not sufficient to forwardly bias transistor 114 to a conductive state, the charge on capacitor 100 is not discharged and a binary one is written into the cell.

However, without additional circuitry, the charge on capacitor 100 would leak off and the information stored in the cell would be lost. In order to maintain the stored information of the storage cell, terminal 134 is lowered to a voltage value of V−. Due to the charge stored on capacitor 100 the node 110 is at a positive value and transistor 128 is sufficiently biased in a forward direction so as to conduct. Therefore in the illustrative example, a binary one is maintained in the storage cell during the standby state by the conduction of transistor 128.

In a similar manner, the application of a binary zero to the input terminal 80 would result in binary zero being stored in the capacitor 100 so as to turn transistor 128 off. However, after the writing of a binary zero the capacitor 88 would be charged to a relatively positive value so as to place the base terminal of transistor 130 at a sufficiently positive value so as to turn it on after the write cycle, and thus during the standby state a binary zero would be represented by the conduction of transistor 130. It can be seen that in this embodiment, a dc signal must be applied to terminal 134 in order to maintain information in the storage cell when it is employed in a static shift register mode.

Although terminal 134 must be maintained at a dc value most of the time, it is within the spirit of this invention to employ pulse powering at terminal 134. From a power standpoint such a pulse powering technique would still exceed to some extent the amount of power which is required in the storage cell of FIG. 1. Such a pulse powering technique to a directly crosscoupled bistable cell is described in U. S. Pat. application Ser. No. 710,947, filed Mar. 6, 1968, now U.S. Pat. No. 3,564,300, issued Feb. 16, 1971, and assigned to the assignee of the present invention.

Figure 3:
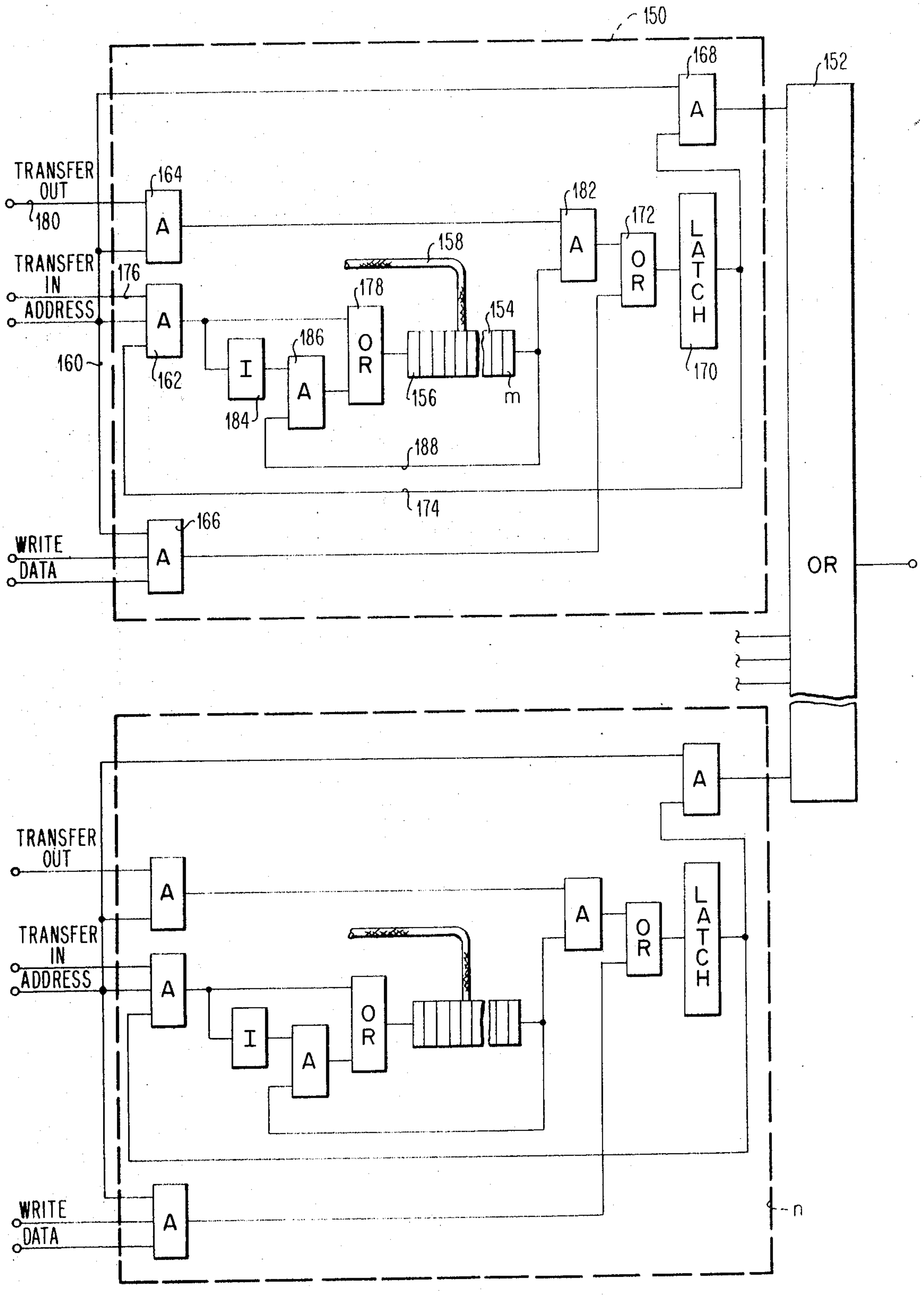
FIG. 3 illustrates the storage cells of FIGS. 1 and 2 incorporated as a shift register with attendant control circuitry and operated in either a static or a dynamic recirculating mode.

FIG. 3 illustrates the manner in which the storage cell of either FIG. 1 or FIG. 2 can be implemented to operate either as a static shift register or a dynamic shift register. For example, a plurality of shift register rows depicted as 150 . . . *n* can be fabricated on a single integrated circuit chip. Appropriate control signals are employed to control the flow of information into and out of each row, and to a final output circuit shown as OR circuit 152. The organization depicted in FIG. 3 is merely illustrative, but it is nonetheless well suited to an integrated circuit shift register implementation for either a two or a three dimensional array.

Taking block 150 as illustrative, the storage cells depicted in FIGS. 1 and 2 are fabricated in monolithic form to provide a shift register 154 having a plurality of stages 156 . . . *m*. Each of the storage cells require individual regeneration sources and control signals and these are generally depicted as a plurality of control lines 158 connected to the shift register 154. These control signals and regeneration sources were shown previously, for example, as signals 52 and 16, respectively.

The control or support circuitry connected to shift register 154 allows it to operate in either a recirculating or a static mode. An address or decode line 160 is employed to select the desired row on a chip and connects to a plurality of input AND gates 162, 164, 166, and to an output AND gate 168.

In order to write information into a row, the AND gate 166 is gated by control signals on the address line 160 and a Write line. The information is applied on the Data line. The AND gate 166 thus sets a latch circuit 170 via OR gate 172 to either a binary one or binary zero state. The output state of the latch 170 is transmitted as an input signal to AND gate 162 via line 174. Therefore, in conjunction with a control signal applied to a Transfer-in line 176 and the control signal on the address line 160, the binary state at the output of the latch 170 is passed via AND gate 162 and an OR circuit 178 into the first stage 156 of the shift register. In this manner, all the stages of the shift register may be written into. In the static mode of operation, the information will not recirculate and only the regeneration and control signals 158 are required to maintain the information in the shift register.

In order to read information out of the last stage of the shift register, the address line 160 is activated along with the application of a control signal to the Transfer out line 180. As a result, the binary information which is stored in the last stage m is passed via AND gate 182, OR gate 172, latch 170 and finally through AND gate 168 to the output OR circuit 152.

During the static mode of operation, an inverter 184 functions to maintain AND gate 186 closed and therefore no information is recirculated via recirculation line 188 from the output of the shift register to its input stage 156.

If the storage cell of FIG. 1 is adapted to operate in a recirculating mode, a plurality of storage cells would be interconnected to form a shift register depicted as 154. However in this application, the control signals 158 would now require appropriate control lines to each of the storage cells in order to bias transistor 50 to a nonconductive state in order that it operate in a dynamic or recirculating mode as previously described with reference to FIG. 1 and to the previously mentioned U. S. Patent Application, Serial Number 18,583.

In the recirculating mode, the address line 160 is not energized and therefore no information is passed to the shift register via AND gate 162. However, a down level at the output of AND gate 162 is inverted by the inverter 184 so as to render AND gate 186 open. Thus as the binary information is recirculated or dynamically passed from one stage to another in response to the control signals 158, the binary state of the output stage *m* is recirculated via line 188, AND gate 186 and OR gate 178 back into the input stage 156. The storage cells of FIGS. 1 and 2 thus may be advantageously and economically implemented into either a static or a recirculating shift register.

While the invention has been particularly shown and described with reference to the particular embodiment thereof, it will be understood by those skilled in the art that the foregoing and other changes in form and detail may be made therein without departing from the spirit and scope thereof.

What is claimed is:

1. A storage cell suitable for implementation as a monolithic static shift register for storing digital information comprising:

a. semiconductor gating means, the gating means including first and second capacitors associated therewith, b. a data input terminal and a data output terminal connected to the semiconductor gating means, c. a charging line means connected to the first and second capacitors, the charging line means being adapted to receive a regeneration source for charging the first and second capacitors, d. the first capacitor being charged from a regeneration source, and selectively discharged in accordance with the digital level received at the data input terminal, e. the second capacitor being connected to the output terminal, the second capacitor being charged from the regeneration source, and selectively discharged in accordance with the charge stored on the first capacitor, the charge stored in the second capacitor being indicative of the digital state of the cell in accordance with the digital level received at the input terminal, and f. the semiconductor gating means further including a bipolar semiconductor switching transistor means connected between the first and second capacitors for maintaining the output terminal at a digital level in accordance with the digital level received at the input terminal so that the cell operates in a static mode, g. whereby the charging and discharging of said first and second capacitors comprise transient current flows.

2. A storage cell suitable for implementation as a monolithic static shift register for storing digital information as in claim 1 wherein:

a. the semiconductor switching means comprises cross-coupled semiconductor flip-flop, and b. the charge stored on the second capacitor is effective to set the semiconductor flip-flop to either one of two conducting states for maintaining the output terminal at a digital level in accordance with the digital information received at the input terminal so that the cell operates in a static mode.

3. A storage cell suitable for implementation in monolithic form for storing digital information comprising:

a. semiconductor gating means, the gating means including a first and a second capacitor associated therewith, b. a data input terminal and a data output terminal connected to the semiconductor gating means, c. a charging line means connected to the first and second capacitor, the charging line means being adapted to receive a regeneration source for charging the first and second capacitors, d. the first capacitor being charged from the regeneration source, and selectively discharged in accordance with the digital level received at the data input terminal, e. the second capacitor being connected to the output terminal, the second capacitor being charged from the regeneration source, and selectively discharged in accordance with the charge stored on the first capacitor, the charge stored on the second capacitor being indicative of the digital state of the cell in accordance with the information received at the input terminal, f. the semiconductor gating means further including a first bipolar semiconductor transistor device means having at least a first control terminal associated therewith, the first control terminal being connected to the second capacitor, and g. the first capacitor being periodically and selectively recharged from the regeneration source in accordance with the charge stored on the second capacitor in order to regenerate anew the charge stored on the second capacitor which is indicative of the digital state of the cell so that the storage cell operates in a static mode, h. whereby the charging and discharging of said first and second capacitors comprise transient current flows.

4. A storage cell suitable for implementation in monolithic form for storing digital information as in claim 3 wherein:

a. the second capacitor is selectively and periodically recharged from the regeneration source in accordance with the first capacitor being periodically and selectively recharged in order to regenerate anew the charge stored on the second capacitor which is indicative of the digital state of the cell so that the storage cell operates in a static mode.

5. A storage cell suitable for implementation in monolithic form for storing digital information as in claim 4 wherein:

a. the semiconductor gating means further comprises a second and a third semiconductor device means, b. the second semiconductor device means being connected to the data input terminal and to the first capacitor, the third semiconductor device means being connected to the first capacitor and to the second capacitor, c. the second semiconductor device means being rendered either nonconductive or conductive in accordance with either one or the other digital levels of information received at the data input terminal in order to selectively charge the first capacitor, d. the third semiconductor device means being rendered non-conductive or conductive in accordance with the charge stored on the first capacitor in order to selectively charge the second capacitor, the charge stored on the second capacitor being indicative of the digital state of the cell in accordance with the information received at the data input terminal, and the third semiconductor device means being periodically rendered nonconductive or conductive in accordance with the periodic recharging of the first capacitor in order to regenerate anew the charge stored on the second capacitor which is indicative of the digital state of the cell so that the storage cell operates in a static mode.

6. A storage cell suitable for implementation in monolithic form for storing digital information as in claim 5 wherein:

a. the second and third semiconductor devices each further include a control terminal, each control terminal of the second and third semiconductor device means being adapted to receive an associated control signal, b. the second semiconductor device means being rendered nonconductive or conductive in response to its associated control signal and to one or the other digital levels received at the data input terminal in order to selectively charge the first capacitor by either maintaining the charge received from the regeneration source on the first capacitor or discharging the charge received from the regeneration source from the first capacitor, c. the third semiconductor device means being rendered nonconductive or conductive in accordance to its associated control signal and to the charge stored on the first capacitor in order to selectively charge the second capacitor by either maintaining the charge received from the regeneration source on the second capacitor or discharging the charge received from the regeneration source from the second capacitor, d. the first semiconductor device means being connected to the first capacitor and having a second control terminal, the second control terminal being adapted to receive an associated control signal, e. the first semiconductor device means being periodically rendered nonconductive or conductive in accordance to its associated control signal and to the charge stored on the second capacitor in order to selectively and periodically recharge the first capacitor by either maintaining the charge received from the regeneration source on the first capacitor or discharging the charge received from the regeneration source from the first capacitor in order to regenerate anew the charge stored on the second capacitor which is indicative of the digital state of the cell so that the storage cell operates in a static mode.

7. A storage cell suitable for implementation in monolithic form for storing digital information as in claim 5 wherein:

a. the second and third semiconductor device means are bipolar transistors, and b. the first and second capacitors are constituted by the parasitic base to collector capacitance of the second and third semiconductor device means bipolar transistors, respectively.

8. A storage cell suitable for implementation in monolithic form for storing digital information as in claim 7 wherein the cell is maintained in a operable static state solely in response to period non-dc signals.

9. A storage cell suitable for implementation in monolithic form for storing digital information as in claim 6 wherein:

a. the second and third semiconductor device means are bipolar transistors, b. the first and second capacitors are constituted by the parasitic base to collector capacitance of the second and third semiconductor device means bipolar transistors, respectively, and c. the storage cell being maintained in an operable static state solely in response to periodic non-dc signals, d. the period non-dc signals comprising the regeneration source and the control signals associated with the first, second and third semiconductor device means.

10. A storage cell suitable for implementation in monolithic form for storing digital information as in claim 9 wherein:

a. the charging line means comprises a first line connected to the first capacitor, the first line being adapted to initially receive a first regeneration signal source for selectively charging the first capacitor during a write mode and also to periodically receive the first regeneration source for recharging the first capacitor in order to regenerate anew the charge stored on the second capacitor during a static standby mode, and b. the charging line means further comprising a second line connected to the second capacitor, the second line being adapted to initially receive a second regeneration signal source for selectively charging the second capacitor during a write mode and also to periodically receive the second regeneration signal source for recharging the second capacitor in order to regenerate anew the charge stored on the second capacitor during a static standby mode.

11. A storage cell suitable for implementation in monolithic form for storing digital information as in Claim 10 wherein:

a. the first line is connected in common to the control terminal associated with the second semiconductor device means, and b. second line is connected in common to the control terminal associated with the third semiconductor device means.

12. A storage cell suitable for implementation in monolithic form for storing digital information as in claim 11 wherein:

a. the second and third semiconductor device means are bipolar transistors, and b. the first and second capacitors are constituted by the parasitic base to collector capacitance of the second and third semiconductor device means bipolar transistors, respectively.

13. A storage cell suitable for implementation in monolithic form for storing binary information as in claim 6 wherein:

a. the second capacitor is selectively and periodically recharged from the regeneration source in accordance with the first capacitor being selectively and periodically recharged in order to regenerate anew the charge stored on the second capacitor which is indicative of the digital state of the cell so that the storage cell operates in a static mode.

* * * * *